United States Patent
Schultz et al.

(10) Patent No.: US 8,392,193 B2
(45) Date of Patent: Mar. 5, 2013

(54) SYSTEMS AND METHODS FOR PERFORMING SPEECH RECOGNITION USING CONSTRAINT BASED PROCESSING

(75) Inventors: Paul T. Schultz, Colorado Springs, CO (US); Robert A. Sartini, Colorado Springs, CO (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1983 days.

(21) Appl. No.: 10/857,446

(22) Filed: Jun. 1, 2004

(65) Prior Publication Data

US 2005/0267754 A1  Dec. 1, 2005

(51) Int. Cl.
*G10L 11/00* (2006.01)

(52) U.S. Cl. ......... 704/270; 704/231; 704/236; 704/252

(58) Field of Classification Search .................. 704/231, 704/236, 252, 275; 379/88.04
See application file for complete search history.

(56) References Cited

U.S. PATENT DOCUMENTS

| | | | |
|---|---|---|---|
| 4,958,368 A | 9/1990 | Parker | |
| 5,146,487 A | 9/1992 | Bergsman et al. | |
| 5,829,000 A * | 10/1998 | Huang et al. | 704/252 |
| 5,867,562 A | 2/1999 | Scherer | |
| 6,016,336 A | 1/2000 | Hanson | |
| 6,058,364 A * | 5/2000 | Goldberg et al. | 704/252 |
| 6,061,654 A * | 5/2000 | Brown et al. | 704/275 |
| 6,122,612 A * | 9/2000 | Goldberg | 704/231 |
| 6,122,615 A * | 9/2000 | Yamamoto | 704/252 |
| 6,223,156 B1 * | 4/2001 | Goldberg et al. | 704/247 |
| 6,292,799 B1 | 9/2001 | Peek et al. | |
| 6,373,939 B1 | 4/2002 | Reese et al. | |
| 6,459,782 B1 | 10/2002 | Bedrosian et al. | |
| 6,598,019 B1 * | 7/2003 | Tokuda et al. | 704/255 |
| 7,035,867 B2 * | 4/2006 | Thompson et al. | 707/102 |
| 7,042,989 B2 | 5/2006 | Lawson et al. | |
| 7,043,989 B2 | 5/2006 | Brink | |
| 7,046,777 B2 | 5/2006 | Colson | |
| 7,143,039 B1 | 11/2006 | Stifelman et al. | |
| 7,240,002 B2 * | 7/2007 | Minamino et al. | 704/253 |
| 2002/0013705 A1 * | 1/2002 | Jaepel et al. | 704/252 |
| 2002/0037073 A1 | 3/2002 | Reese et al. | |
| 2003/0081744 A1 | 5/2003 | Gurfein et al. | |
| 2003/0191639 A1 * | 10/2003 | Mazza | 704/231 |
| 2003/0228007 A1 * | 12/2003 | Kurosaki | 379/142.06 |
| 2004/0071275 A1 | 4/2004 | Bowater et al. | |
| 2004/0190687 A1 | 9/2004 | Baker | |
| 2004/0198461 A1 | 10/2004 | Goombes | |
| 2005/0100144 A1 | 5/2005 | O'Connor | |
| 2005/0137868 A1 * | 6/2005 | Epstein et al. | 704/252 |
| 2005/0149328 A1 * | 7/2005 | Huang et al. | 704/252 |
| 2005/0233735 A1 | 10/2005 | Karaoguz et al. | |
| 2005/0267748 A1 | 12/2005 | Wilkes | |

OTHER PUBLICATIONS

"What is a VIN Number?", Oct. 2000, http://web.archive.org/web/20001017235211/http://www.nsxprime.com/FAQ/General/vin.htm.*

* cited by examiner

*Primary Examiner* — Douglas Godbold

(57) ABSTRACT

A method for performing speech recognition includes receiving a voice input and generating at least one possible result corresponding to the voice input. The method may also include calculating a value for the speech recognition result and comparing the calculated value to a particular portion of the speech recognition result. The method may further include retrieving information based on one or more factors associated with the voice input and using the retrieved information to determine a likelihood that the speech recognition result is correct.

29 Claims, 5 Drawing Sheets

SYSTEMS AND METHODS FOR PERFORMING SPEECH RECOGNITION USING CONSTRAINT BASED PROCESSING

FIELD OF THE INVENTION

The present invention relates to speech recognition and, more particularly, to improving accuracy associated with speech recognition.

BACKGROUND OF THE INVENTION

Conventional speech recognition systems attempt to convert speech from a user into text that represents the words that were actually spoken by the user. Such speech recognition systems typically suffer from a number of problems and are relatively inaccurate. That is, conventional speech recognition systems are often unable to determine what was spoken or incorrectly determine what was spoken. In either case, such problems limit the usefulness of these speech recognition systems.

SUMMARY OF THE INVENTION

There exists a need for systems and methods that provide increased accuracy in speech recognition.

According to one aspect of the invention, a method for performing speech recognition is provided. The method includes receiving a voice input and generating a speech recognition result based on the voice input. The method also includes calculating a value using the speech recognition result and comparing the calculated value to a portion of the speech recognition result.

According to another aspect of the invention, a system including a memory and a logic device is provided. The memory is configured to store a number of rules associated with performing speech recognition, where at least a portion of the rules are based on constraints associated with a type of information for which the speech recognition is to be performed. The logic device is configured to receive a voice input and generate at least one speech recognition result based on the voice input using rules stored in the memory.

Another aspect of the present invention provides a computer-readable medium that includes sequences of instructions, which when executed by a processor, cause the processor to generate a speech recognition result based on a voice input. The instructions also cause the processor to calculate a value using at least a portion of the speech recognition result and determine whether the speech recognition result is incorrect using the calculated value.

Other features and advantages of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

DETAILED DESCRIPTION

Figure 1:
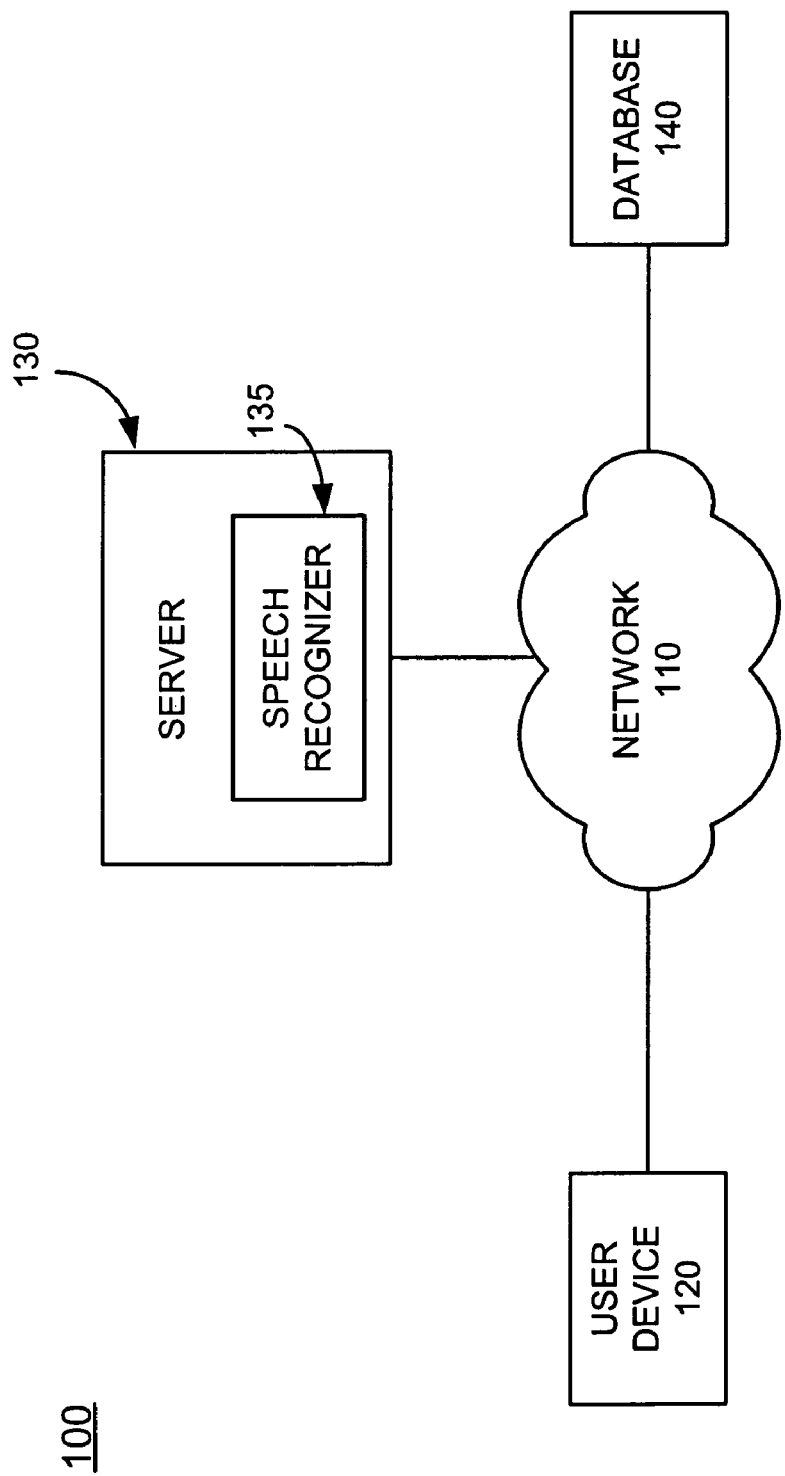
FIG. 1 is a block diagram of an exemplary system in which methods and systems consistent with the invention may be implemented.

FIG. 1 is a block diagram of an exemplary system 100 in which methods and systems consistent with the invention may be implemented. System 100 may include network 110, user device 120, server 130 and database 140. The exemplary configuration illustrated in FIG. 1 is provided for simplicity. It should be understood that a typical system may include more or fewer devices than illustrated in FIG. 1. In addition, other devices that facilitate communications between the various entities illustrated in FIG. 1 may also be included in system 100.

Network 110 may include any type of network, such as a local area network (LAN), a wide area network (WAN), a public telephone network (e.g., the public switched telephone network (PSTN)), a wireless network, a virtual private network (VPN), the Internet, an intranet, or a combination of networks. The connections shown in FIG. 1 may be wired, wireless and/or optical connections.

Network 110 may further include one or more devices, such as a network gateway, that allow divergent transport networks to communicate and cooperatively carry traffic. The network gateway may also adapt analog or pulse code modulation (PCM) encoded voice signals to a packetized data stream suitable for transport over network 110.

User device 120 may include any type of conventional telephone that is used to place and receive telephone calls. For example, user device 120 may be a standard telephone, a cordless telephone, a cellular telephone or any other type of conventional telephone.

User device 120 may also include any type of device that is capable of transmitting and receiving voice signals to/from a network. For example, user device 120 may include any client device, such as a personal computer (PC), a laptop computer, a personal digital assistant (PDA), a web-based appliance, etc., that is configured to provide telephone functions and is able to transmit/receive voice signals via network 110. User device 120 may, for example, be a session initiation protocol (SIP)-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional PC, laptop computer or other computing device.

Server 130 may include any server and/or computing device that is able to connect to network 110 and transmit and receive information via network 110. Server 130 may also include a telephone device (not shown) that interfaces with network 110 to receive and/or place telephone calls. In an exemplary implementation consistent with the invention, server 130 may include a speech recognizer 135 that performs speech recognition.

Figure 2:
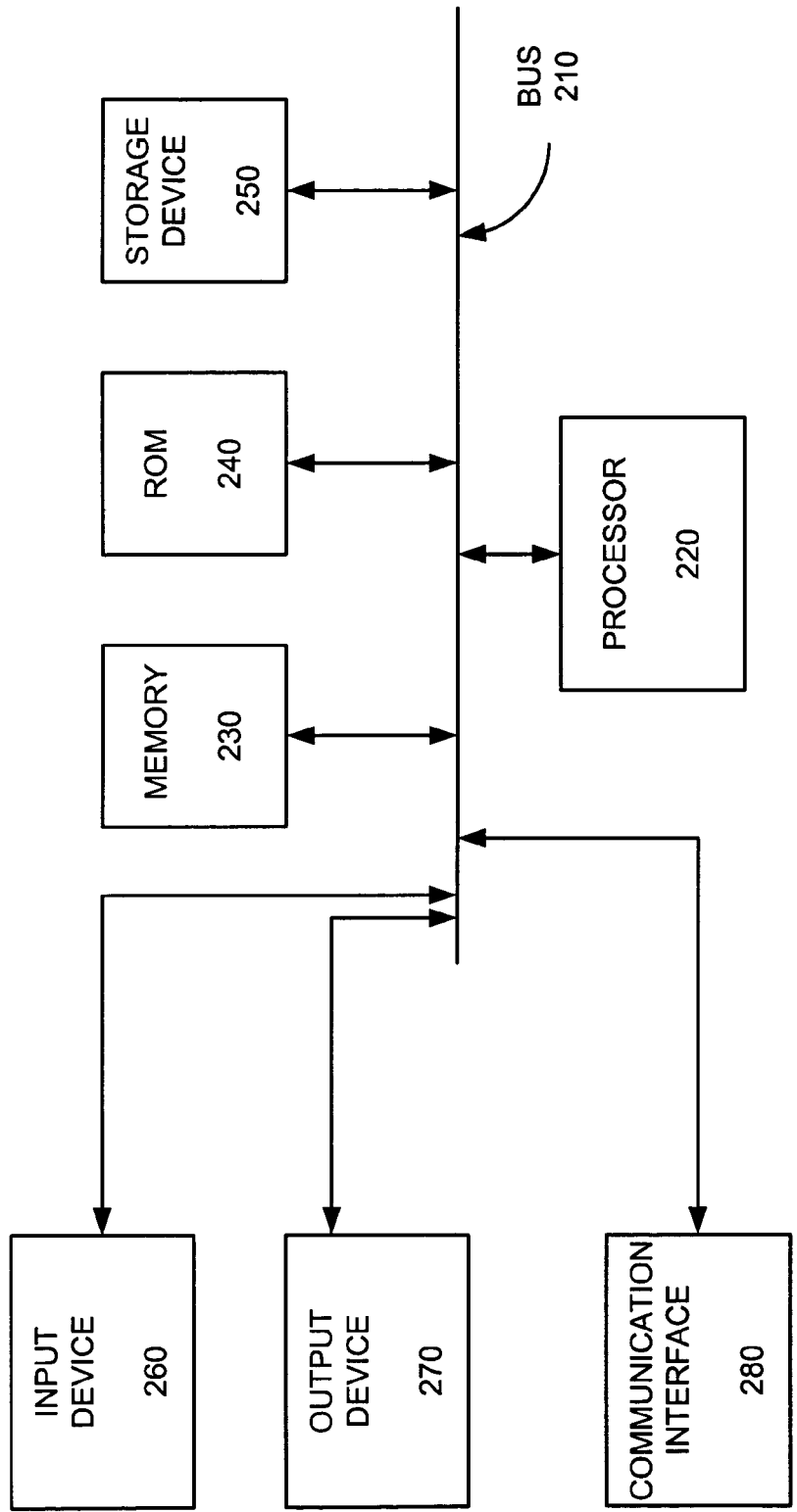
FIG. 2 is an exemplary block diagram of the server of FIG. 1 in which systems and methods consistent with the invention may be implemented.

FIG. 2 illustrates an exemplary configuration of server 130 in an implementation consistent with the invention. Other configurations may alternatively be used. Server 130 may include a bus 210, a processor 220, a memory 230, a read only memory (ROM) 240, a storage device 250, an input device 260, an output device 270, and a communication interface 280. Bus 210 permits communication among the components of server 130.

Processor 220 may include any type of conventional processor or microprocessor that interprets and executes instructions. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a conventional ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions.

Input device 260 may include one or more conventional mechanisms that permit an operator to input information to server 130, such as a keyboard, a mouse, a pen, voice recognition and/or biometric mechanisms, etc. Output device 270 may include one or more conventional mechanisms that output information to the operator, including a display, a printer, one or more speakers, etc. Communication interface 280 may include any transceiver-like mechanism that enables server 130 to communicate with other devices and/or systems. For example, communication interface 280 may include a modem or an Ethernet interface to a LAN. Alternatively, communication interface 280 may include other mechanisms for communicating via a network.

Server 130, consistent with the invention, may perform processing associated with speech recognition in response to processor 220 executing sequences of instructions contained in memory 230. Such instructions may be read into memory 230 from another computer-readable medium, such as storage device 250, or from a separate device via communication interface 280. It should be understood that a computer-readable medium may include one or more memory devices or carrier waves. Execution of the sequences of instructions contained in memory 230 causes processor 220 to perform the acts that will be described hereafter. In alternative embodiments, hard-wired circuitry may be used in place of or in combination with software instructions to implement the invention. Thus, implementations consistent with the invention are not limited to any specific combination of hardware circuitry and software.

Referring back to FIG. 1, database 140 may include one or more memory devices that store data. In an exemplary implementation, database 140 may also include one or more processors, computers and/or servers that control access to database 140 and facilitate searching of database 140. These processor(s)/computer(s)/server(s) may be configured in a manner similar to server 130 illustrated in FIG. 2.

In one implementation, database 140 may store information associated with motor vehicles. For example, database 140 may store vehicle identification numbers (VINs) for all vehicles registered in a particular state and the owners of the vehicles. A VIN, as described in more detail below, is a unique 17 character identifier associated with a vehicle. In other implementations, database 140 may store VINs associated with a particular manufacturer or may store other information based on the particular application.

Server 130 and database 140 are illustrated in FIG. 1 as being connected via network 110. In alternative implementations, server 130 and database 140 may be connected directly to each other, connected via a LAN, connected via a private network, etc. In still other alternative implementations, the functions performed by server 130 and database 140, described in more detail below, may be performed by a single device/platform.

Figure 3:
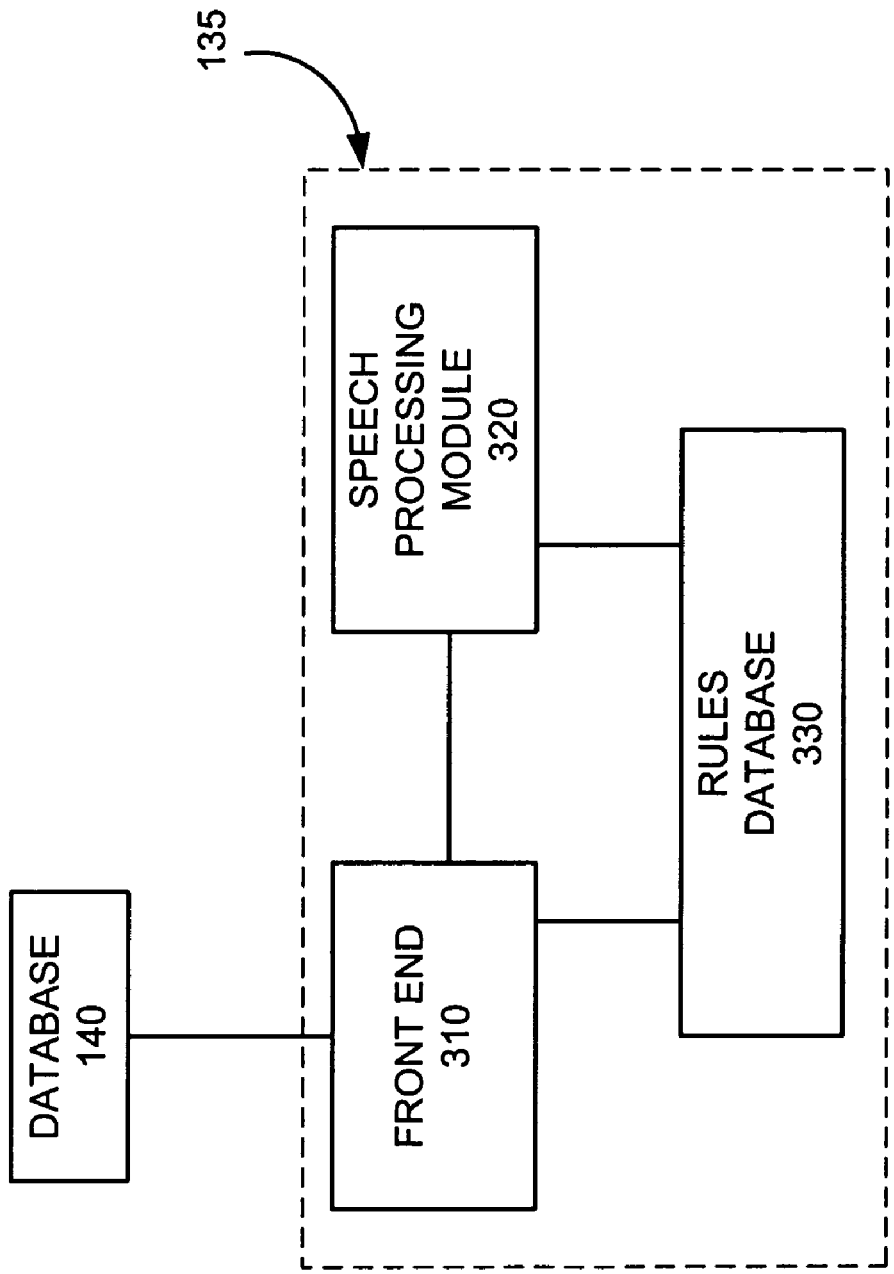
FIG. 3 is an exemplary functional block diagram of the speech recognizer of FIG. 1, consistent with the invention.

FIG. 3 is an exemplary functional block diagram of speech recognizer 135, according to an implementation consistent with the invention. The logical blocks illustrated in FIG. 3 may be implemented in software, hardware, or a combination of hardware and software. Speech recognizer 135 is illustrated in FIG. 1 as being implemented in server 130. It should be understood that speech recognizer 135 may be located externally from server 130 in other implementations.

Speech recognizer 135 may include a front end 310, a speech processing module 320 and a rules database 330. Front end 310 may include an automatic number identification (ANI) system that determines the telephone number associated with an incoming call. For example, front end 310 may receive an incoming call from user device 120 and determine the caller's telephone number. Front end 310 may also determine the caller's name based on the telephone number by accessing a database of caller telephone numbers and corresponding names. The database of telephone numbers and corresponding names may be stored on server 130, such as on storage device 250, or on a device located externally from server 130.

Front end 310 may also access database 140 to retrieve information associated with that caller. For example, front end 310 may use the caller's telephone number and/or name as an index to database 140 to retrieve information associated with that particular caller, as described in more detail below. This information may be forwarded to speech processing module 320 and/or rules database 330.

Speech processing module 320 performs speech recognition on voice data input from a caller. Speech processing module 320 may perform the speech recognition in accordance with rules or grammars stored in rules database 330, as described in more detail below. Speech processing module 320, consistent with the invention, may generate a list of most likely results corresponding to a speech input. Speech processing module 320 may also perform a check of the most likely results by calculating a check value to further enhance the likelihood of generating the correct speech recognition result.

Rules database 330 may store a number of rules or grammars associated with performing speech recognition. For example, a grammar may define a particular rule with respect to performing speech recognition. In an implementation consistent with the invention, the grammars stored in rules database 330 may be customized based on constraints associated with the subject of the speech recognition process.

Figure 4:
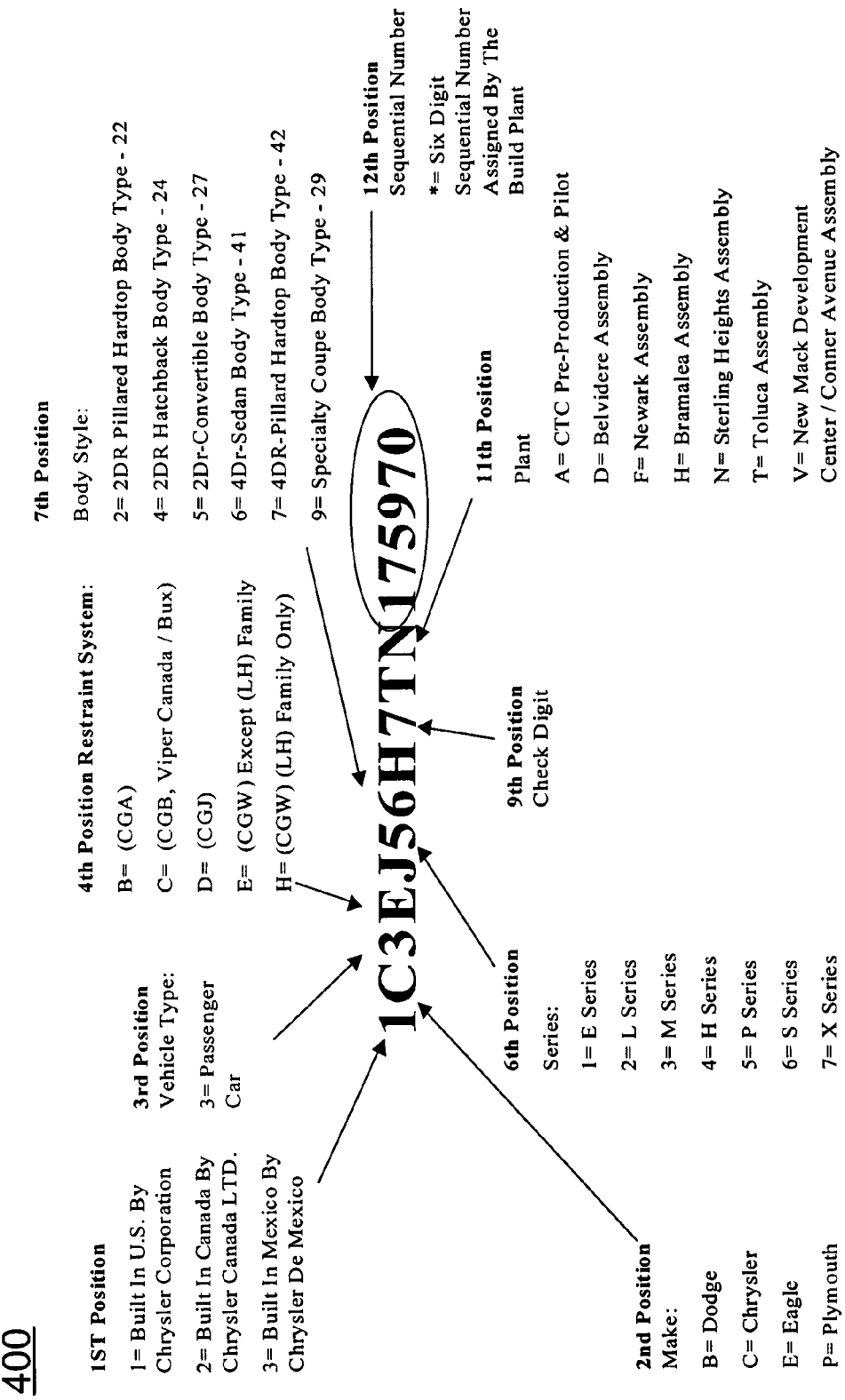
FIG. 4 illustrates constraints associated with an exemplary vehicle identification number.

For example, assume that speech processing module 320 is designed to identify a VIN voiced by a caller. FIG. 4 illustrates an exemplary VIN. Referring to FIG. 4, VIN 400 includes 17 alphanumeric characters. The various characters in VIN 400 represent particular information associated with the vehicle. For example, as illustrated in FIG. 4, the first character represents a country in which the vehicle was built, the second character represents the vehicle make, the third character represents the vehicle type, the fourth character represents the type of restraint system, the sixth character represents the vehicle series, the seventh character represents the body style, the ninth character represents a check digit, the eleventh character represents the plant where the vehicle was manufactured and the twelfth through sixteenth characters represent a sequential number assigned by the plant which manufactured the vehicle.

As discussed above, rules database 330 may store a number of grammars. One or more of the grammars may be based on the constraints associated with a VIN, such as VIN 400. For example, one grammar may be that the first character in the VIN is a number ranging from 0-9. Another grammar may be that the second character is an alpha character that is one of B, C, E or F, which represent the four possible makes of vehicles associated with a particular manufacturer. In this example, the application associated with speech recognizer 135 is associated with vehicles manufactured by Chrysler. Still another grammar may be that the fourth character is one of B, C, D, E and H. In this manner, grammars stored in rules database 330 are based on particular constraints that are associated with the subject of the speech recognition process (e.g., VINs for a particular manufacturer in this example).

The grammars stored in rules database 330 may also be grouped based on, for example, a particular model year of the vehicle to provide a further enhancement with respect to the speech recognition process. In other words, since the possible values associated with one or more characters in the VIN may vary based on the model year, grouping grammars based on the model year will result in a better chance of achieving correct results for the speech recognition process. For example, for the model year 1980, the Eagle division of Chrysler Corporation may not have existed. In this case, when performing a speech recognition process involving VINs for Chrysler vehicles, the possible characters for the second character in VIN 400 may be B, C and P, representing Dodge, Chrysler and Plymouth. In this case, a grammar for model year 1980 may be that the second character is B, C or P.

The grammars may be grouped based on other pertinent information, such as vehicle make, vehicle model, etc. In this manner, grammars stored in rules database 330 may be correlated to various factors. This enables speech processing module 320 to further narrow the possible choices for one or more characters in a voice input and to more accurately generate speech recognition results, as described in more detail below.

Figure 5:
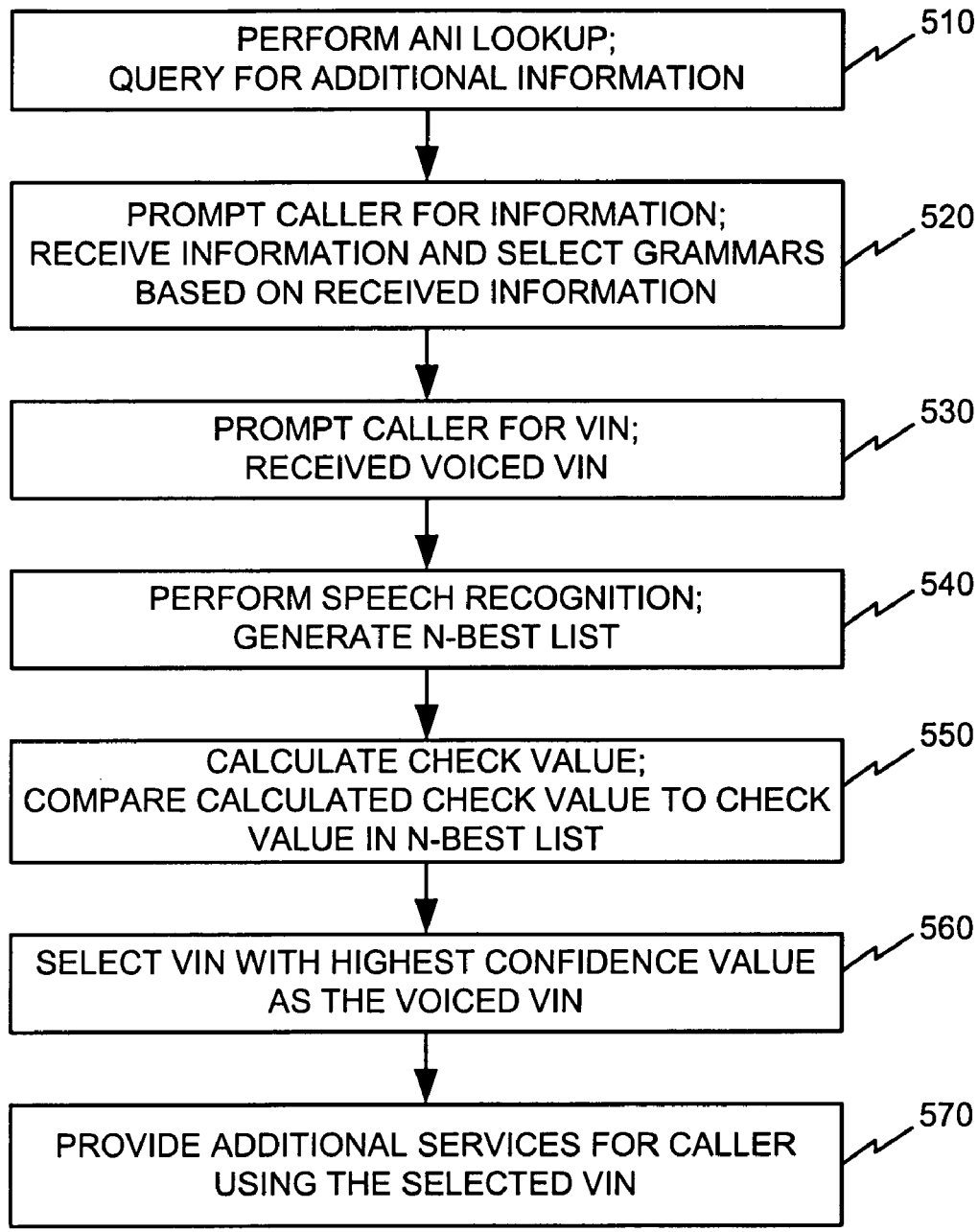
FIG. 5 is an exemplary flow diagram, consistent with the invention, illustrating processing associated with performing speech recognition.

FIG. 5 is an exemplary flow diagram illustrating processing associated with performing speech recognition, consistent with the invention. Processing may begin with a caller establishing communications with server 130 via user device 120. For example, a caller at user device 120 may dial a telephone number associated with server 130 or enter an Internet address associated with server 130. Server 130, as described above, may include a telephone device (not shown) that is able to receive telephone calls. Alternatively, a telephone device not associated with server 130 may receive the call and forward the call to server 130.

After the telephone call to server 130 has been established, front end 310 may provide an automated greeting to the caller at user device 120. For example, front end 310 may provide a greeting, such as "To access vehicle related information, press 1." Alternatively, front end 310 may provide a menu of options and request that the caller voice a selection. In this case, speech processing module 320 may determine the caller's selection.

Front end 310, consistent with the invention, may optionally perform an ANI lookup to identify the telephone number of the caller (act 510). Front end 310, as discussed above, may then access a database accessible via server 130 (or located within server 130) to determine a name associated with the caller's telephone number. Front end 310 may then access database 140 or send a search query to database 140 to attempt to retrieve information based on the caller's name and/or telephone number (act 510).

For example, front end 310 may use the identified name and/or telephone number associated with the caller as an index into database 140 to attempt to identify information associated with the caller that may be stored in database 140. Database 140 may return the results of the search to front end 310. For example, suppose that database 140 stores VINs and an owner's name associated with each VIN and that the result of the query indicates that the caller owns two motor vehicles. Database 140 may forward the two VINs associated with the two vehicles to front end 310. Front end 310 may receive the two VINs and forward this information to speech processing module 320. This information may then be used by speech processing module 320 as an aid when performing speech recognition, as described in more detail below.

After determining that the caller wishes to retrieve information associated with his/her vehicle, front end 310 may prompt the caller for information (act 520). For example, front end 310 may prompt the caller to provide the model year of the vehicle. Prompting the caller for the model year may enable speech processing module 320 to select grammars that are particular to that model year. For example, as discussed above, the grammars associated with model year 1980 may be different than the grammars associated with model year 2000. Using the grammars associated with the appropriate model year increases the likelihood that the speech recognition process is performed accurately.

Assume that the caller voices the model year. Speech processing module 320 receives the year voiced by the caller and uses its speech recognition process to determine what the caller said. In general, speech recognition associated with numbers is typically more accurate than speech recognition that involves alphabetic characters. Therefore, speech processing module 320 will have a high degree of confidence that the result of the speech recognition process on the model year will be accurate. In alternative implementations, front end 310 may ask the user to enter the model year using the keypad of a touchtone telephone, if available.

Assume that speech processing module 320 correctly identifies the model year. Speech processing module 320 may then select the appropriate grammars based on the model year (act 520). Front end 310 may then prompt the caller to voice the VIN for the vehicle for which the caller wishes to retrieve information (act 530). For example, front end 310 may provide a message such as, "Please state your 17 character VIN." The caller may then voice the 17 character VIN and speech processing module 320 receives the voiced VIN (act 530).

Speech processing module 320 may then execute a speech recognition process on the voiced VIN (act 540). In the example above, speech processing module 320 identified the vehicle model year prior to requesting the VIN. In this case, speech processing module 320 may use particular grammars associated with the identified model year stored in rules database 330. This helps narrow the possibilities with respect to the speech recognition process and increases the probability that the speech recognition result will be correct.

Speech processing module 320 may also use the information retrieved at act 510 to further enhance the speech recognition process. That is, in the example above, front end 310 retrieved two VINs based on an ANI lookup and query of database 140. Front end 310 also forwarded the retrieved VINs to speech processing module 320. For example, speech processing module 320 may compare a list of speech recognition results to the retrieved information to weight the results since there is a fairly good possibility that the voice VIN will be one of the two VINs retrieved from database 140, as described in more detail below. In alternative implementations, speech processing module 320 may use these VINs essentially as additional grammars to be used when generating the speech recognition result.

Speech processing module 320 performs the speech recognition process on the voiced VIN using the identified grammars stored in rules database 330. Speech processing module 320, consistent with the invention, may generate an N-best list of possible VINs, where N is a predetermined number (act 540). For example, in one implementation, N may be 10. In this case, speech processing module 320 generates 10 possible VINs based on the voiced VIN. It should be understood, however, that N may be greater or smaller based on, for example, the particular application and the type of voiced information that is being received.

Each of the N-best VINs may also be weighted as to the likelihood that it is the correct VIN. For example, if any of the N-best VINs match the VINs retrieved from database 140, the likelihood that that VIN is correct increases greatly. In this case, a likelihood score or confidence value for that VIN is increased. The higher the confidence value, the more likely the speech recognition result is correct. Other factors may be used to weight the VINs in the N-best list.

For example, if it is known that 60% of a certain vehicle type have a particular body style, speech processing module 320 may check whether the VINs in the N-best list correspond to the probabilities associated with vehicle type and body style. That is, speech processing module 320 may look at the third character (vehicle type) and seventh character (body style) to determine if these values correspond to the most likely combination. In the event that they correspond, the confidence value for that VIN may be increased.

In other implementations, weighting factors may be based on the particular characters in the VIN. For example, a letter such as B may be harder to identify via speech recognition than a letter such as F, based on the fact that more letters sound like B than sound like F. Therefore, speech processing module 320 may weight the VINs based on the particular characters determined during the speech recognition process. Any number of other pertinent factors may be used to determine the weighting for the VINs in the N-best list based on the particular application.

Speech processing module 320 may also check one or more of the VINs in the N-best list by using a check value included in the actual 17-bit VIN. For example, as discussed above with respect to FIG. 4, the ninth character in a VIN is a check character that is calculated by applying a mathematical formula to the 17 character VIN.

For example, in an exemplary implementation, the check value assigned by manufactures to vehicles is calculated as follows. First, each number in the VIN is assigned its mathematical value and each letter in the VIN is assigned a value specified for that letter. The assigned value for each character in the VIN may then be multiplied by a predetermined weighting factor. The weighting factor for the check value is zero. The resulting products are added and the total is divided by 11. The remainder of this calculation is the check value. In the event that the reminder is 10, the check value is the alpha character X. It should be understood that other mathematical formulas used to generate check values or checksums may be used. In addition, in alternative implementations, only a portion of the speech recognition result may be used to generate the check value or checksum. In each case, however, speech processing module 320 stores the same mathematical formula that was used to generate the check value assigned by the manufacturer.

Speech processing module 320 may then calculate the check value for the first VIN in the N-best list using the predetermined formula (act 550). Speech processing module 320 may then compare the calculated check value to the check value (i.e., ninth character) in the speech recognition result for the first VIN in the N-best list (act 550). If the calculated check value does not match the check value in the speech recognition result, that particular VIN is not a valid VIN and therefore can be eliminated as a possible result. Speech processing module 320 may repeat this process for each VIN in the N-best list.

In most situations, only the correct VIN in the N-best list will pass this check (i.e., the calculated check value will match the corresponding check value in the N-best list) and this VIN has a very high probability of being the correct VIN. This VIN may be assigned a very high confidence value indicating that it is the most likely result. In the event that more than one VIN pass the check value check, speech processing module 320 may apply a different confidence value based on other weighting factors, such as those described above.

Based on the confidence values, speech processing module 320 may determine that the VIN with the highest confidence value is the correct VIN (act 560). In some implementations, speech processing module 320 may voice a message to the caller asking the caller to verify that the VIN with the highest confidence value is correct. For example, speech processing module 320 may voice a message to the caller, such as, "Your VIN is IC3EJ56H7TN000001, is this correct?" Assuming that the caller says yes (or presses a key on a touchtone telephone indicating that the VIN is correct), speech processing module 320 may use the VIN to perform a desired service(s) for the caller.

If the user says no to the question and another one of the VINs in the N-best list passed the check value check (e.g., the VIN with the next highest confidence value), speech processing module 320 may ask the caller if that second VIN is correct. If none of the VINs in the N-best list are correct, speech processing module 320 may prompt the caller for additional information, such as the vehicle make and/or vehicle model. Speech processing module 320 may receive the voiced make and/or model, perform a speech recognition process on the voiced make and/or model, correlate the make and/or model to a corresponding character and go through the VINs in the N-best list to attempt to locate the correct VIN (e.g., a VIN that has a character corresponding to the voiced make and/or model provided by the caller). Alternatively, speech processing module 320 may select new grammars based on the make and/or model and repeat the speech recognition process. If the repeated speech recognition process fails this time (e.g., no result has a predetermined confidence value and/or the caller answers no to a confirmation question regarding the VIN), speech processing module 320 may ask the caller for more information and/or ask the caller to restate the VIN. Speech processing module 320 may then repeat the speech recognition process using the additional information to identify new grammars in rules database 320 along with the re-voiced VIN.

Assume that one of the VINs in the N-best list is the correct VIN. Speech processing module 320 may then use the VIN to perform services for the caller (act 570). For example, in one implementation associated with vehicle registration, speech processing module 320 may enable the user to renew his/her vehicle registration over the telephone. In this case, voice processing module 320 may provide one or more voice commands to the caller and allow the caller to voice a credit card number or enter a credit card number via the keypad on the touchtone telephone.

In another implementation associated with vehicle recall information, voice processing module 320 may provide the caller with recall information for that particular VIN. In this case, the recall information for vehicles may be stored on server 130 or a database accessible to server 130. For example, if the database with recall information is located externally with respect to server 130, speech processing module 320 may access the external database via, for example, network 110 and query the recall database using the appropriate VIN. Speech processing module 320 may also be configured to access a predetermined website via network 110 to retrieve the recall information.

Speech processing module 320, or another module located on server 130, may then perform a text-to-speech conversion associated with the retrieved recall information and voice the recall information to the caller.

In other implementations consistent with the invention, the services performed by server 130 based on the VIN may include, for example, receiving and storing results of vehicle safety tests performed on the vehicle, receiving and storing vehicle emissions tests performed on the vehicle, etc.

CONCLUSION

Systems and methods consistent with the invention provide an enhanced voice recognition process. Aspects consistent with the invention utilize customized speech recognition grammars based on constraints associated with the particular information that is being voiced. This allows the speech recognition process to generate more accurate results. In addition, a check value may also be calculated and compared to a portion of the speech recognition result to further increase the accuracy of the speech recognition results. Aspects consistent with the invention also leverage existing data, such as data retrieved based on an ANI lookup, to further ensure accurate speech recognition results.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

For example, implementations consistent with the principle of the invention have been described with the example of performing speech recognition associated with a VIN voiced by a caller. It should be understood that implementations consistent with the principles of the invention may perform speech recognition for other types of information.

For example, similar processing may be performed with respect to a bank routing number voiced by a caller, a credit card number voiced by a caller or other information voiced by a caller. In the case of bank routing numbers and credit card numbers, these numbers also include a checksum value. Therefore, for voice recognition systems associated with these types of information, calculating a check value and comparing the calculated check value to a voice recognition result may yield improved results as compared to conventional systems.

In addition, implementations consistent with the principles of the invention have been described with the example of using an ANI lookup to index a database to obtain information that may aid in performing speech recognition or may be used to weight the speech recognition results. It should be understood that in alternative implementations, other existing information may be retrieved and leveraged to aid in performing the speech recognition process. Lastly, a series of acts has been described with respect to FIG. 5. The order of the acts may be varied in other implementations consistent with the invention. Moreover, non-dependent acts may be performed in parallel. Further, the invention is not limited to any specific combination of hardware circuitry and/or software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A method for performing speech recognition, comprising:
    storing, by a processor, a plurality of rules associated with performing speech recognition, at least some of the plurality of rules being based on constraints associated with a subject matter of a voice input;
    receiving, by the processor, a telephone call from a caller;
    determining, by the processor, a telephone number from which the telephone call was made;
    retrieving, by the processor and from a first database, information associated with the telephone number;
    receiving, by the processor, a first voice input from the caller, the first voice input including information regarding a model year of a vehicle;
    generating, by the processor, a first speech recognition result corresponding to the first voice input;
    identifying, by the processor, a first group of the plurality of rules based on the first speech recognition result;
    receiving, by the processor, a second voice input from the caller, the second voice input including a plurality of characters in a sequence, the plurality of characters corresponding to a first vehicle identification number;
    generating, by the processor, a second speech recognition result based on the second voice input using the first group of rules, at least a first one of the first group of rules being associated with identifying one or more of the characters in the sequence and being constrained to identify one of a subset of possible characters based on a position in the sequence;
    comparing, by the processor, the second speech recognition result to the retrieved information;
    increasing, by the processor, a confidence value associated with the second speech recognition result when the second speech recognition result matches at least a portion of the retrieved information;
    calculating, by the processor, a value using the second speech recognition result;
    comparing, by the processor, the calculated value to a portion of the second speech recognition result;
    increasing, by the processor, the confidence value associated with the second speech recognition result when the calculated value matches the portion of the second speech recognition result;
    providing, by the processor, a first prompt to confirm a second vehicle identification number based on the second speech recognition result being associated with the increased confidence value;

receiving, by the processor, information indicating that the second vehicle identification number does not correspond to the first vehicle identification number;
applying, by the processor and based on receiving the information indicating that the second vehicle identification number does not correspond to the first vehicle identification number, a second group of the plurality of rules to the second voice input, the second group of the plurality of rules being different than the first group of the plurality of rules;
generating, by the processor, a third speech recognition result based on applying the second group of the plurality of rules to the second voice input, the third speech recognition result corresponding to a third vehicle identification number; and
providing, by the processor, a second prompt to confirm the third speech recognition result.

2. The method of claim 1, where the portion of the speech recognition result represents a predetermined character position in the second speech recognition result, the method further comprising:
eliminating the second speech recognition result as a possible speech recognition result when the calculated value does not match the portion of the second speech recognition result.

3. The method of claim 1, further comprising:
generating a plurality of speech recognition results based on the second voice input;
calculating a value for each of the plurality of speech recognition results;
comparing each calculated value to a portion of a corresponding speech recognition result, of the plurality of speech recognition results; and
determining a confidence value associated with each of the plurality of respective speech recognition results.

4. The method of claim 1, where comparing the calculated value to a portion of the second speech recognition result includes:
comparing the calculated value to a ninth character of the second speech recognition result.

5. The method of claim 1, where the generating a second speech recognition result comprises:
using the retrieved information to generate the second speech recognition result.

6. The method of claim 1, further comprising:
providing a first prompt for information to the caller; and
receiving the first voice input from the caller based on the first prompt,
where the generating a second speech recognition result includes:
using the first speech recognition result to select at least the first one of the first group of rules.

7. The method of claim 6, further comprising:
providing a second prompt for information to the caller; and
receiving the second voice input from the caller based on the second prompt,
where the generating a second speech recognition result further includes:
using the second voice input to select at least one other rule associated with performing speech recognition on the second voice input.

8. The method of claim 1, where the plurality of characters comprises a plurality of letters and numbers and the subset of possible characters includes less than all of the letters in an alphabet.

9. A system, comprising:
a memory to store a plurality of rules associated with performing speech recognition, at least a portion of the rules being based on constraints associated with a subject matter for which the speech recognition is to be performed;
an input device to receive a telephone call from a caller; and
at least one logic device to:
determine a telephone number from which the telephone call was made,
retrieve information based on the telephone number,
receive a first voice input from the caller,
generate a first speech recognition result corresponding to the first voice input,
identify a first group of the plurality of rules based on the first speech recognition result,
receive a second voice input, the second voice input including at least one of a plurality of characters in a sequence,
generate a second speech recognition result based on the second voice input using a first group of rules stored in the memory, at least a first one of the first group of rules being associated with identifying one or more characters in the sequence and being constrained to identify one of a subset of characters based on a position in the sequence, the subset of characters including less than all of a possible number of characters,
compare the retrieved information to the second speech recognition result;
provide a first prompt to confirm the second speech recognition result;
receive information indicating that the second speech recognition result does not correspond to the second voice input;
apply, based on receiving the information indicating that the second speech recognition result does not correspond to the second voice input, a second group of the plurality of rules to the second voice input, the second group of the plurality of rules being different than the first group of the plurality of rules;
generate a third speech recognition result based on applying the second group of rules to the second voice input; and
provide a second prompt to confirm the third speech recognition result.

10. The system of claim 9, where the at least one logic device is further to:
calculate a value for the second speech recognition result, and
compare the calculated value to a portion of the second speech recognition result.

11. The system of claim 10, where the at least one logic device is further to:
determine that the second speech recognition result is a potentially correct speech recognition result when the calculated value matches the portion of the second speech recognition result.

12. The system of claim 9, where the memory is further to:
store the plurality of rules based on a plurality of predetermined constraints associated with the subject matter for which the speech recognition is to be performed.

13. The system of claim 9, where the at least one logic device is further to:
provide a first prompt to the caller; and
receive the first voice input based on the first prompt,
where, when generating the second speech recognition result the at least one logic device is to:

use the first speech recognition result to select at least the first rule.

14. The system of claim 13, where the at least one logic device is further to:
provide a second prompt to the caller, and
receive second information based on the second prompt,
where when generating the second speech recognition result, the at least one logic device is further to:
use the second voice input to at select at least one other rule associated with performing speech recognition on the second voice input.

15. The system of claim 9, where when generating a second speech recognition result, the at least one logic device is to:
generate a plurality of speech recognition results, each of the plurality of speech recognition results representing a potentially correct speech recognition result.

16. The system of claim 15, where the at least one logic device is further to:
weight each of the plurality of speech recognition results, and
identify one of the plurality of speech recognition as having a highest likelihood of correctly corresponding to the second voice input based on the weighting.

17. The system of claim 9, where the plurality of characters comprises a plurality of letters and numbers and the subset of characters includes less than all of the letters in an alphabet.

18. A non-transitory computer-readable memory storing instructions, the instructions comprising:
one or more instructions which, when executed by a processor, cause the processor to determine a telephone number from which a telephone call was made;
one or more instructions which, when executed by the processor, cause the processor to access a first database to retrieve information associated with the telephone number;
one or more instructions which, when executed by the processor, cause the processor to generate a first speech recognition result corresponding to a first voice input;
one or more instructions which, when executed by the processor, cause the processor to identify a first plurality of rules based on the first speech recognition result;
one or more instructions which, when executed by the processor, cause the processor to generate a second speech recognition result based on a second voice input, the second voice input including a plurality of characters in a sequence, the one or more instructions to generate the second speech recognition result including:
one or more instructions which, when executed by the processor, cause the processor to identify at least a first one of the characters in the second voice input using at least a first one of the first plurality of rules, the first rule being associated with identifying one or more characters in the sequence based on constraints associated with a position in the sequence, the constraints defining a subset of characters for which the second speech recognition result would be correct;
one or more instructions which, when executed by the processor, cause the processor to calculate a value using at least a portion of the second speech recognition result;
one or more instructions which, when executed by the processor, cause the processor to determine whether the second speech recognition result is incorrect using the calculated value;
one or more instructions which, when executed by the processor, cause the processor to compare the second speech recognition result to the retrieved information to generate a confidence value for the second speech recognition result;
one or more instructions which, when executed by the processor, cause the processor to provide a first prompt to confirm the second speech recognition result;
one or more instructions which, when executed by the processor, cause the processor to receive information indicating that the second speech recognition result does not correspond to the second voice input;
one or more instructions which, when executed by the processor, cause the processor to apply, based on receiving the information indicating that the second speech recognition result does not correspond to the second voice input, a second one of the plurality of rules to the second voice input, the second one of the plurality of rules being different than the first one of the plurality of rules;
one or more instructions which, when executed by the processor, cause the processor to generate another speech recognition result based on applying the second one of the plurality of rules to the second voice input; and
one or more instructions which, when executed by the processor, cause the processor to provide a second prompt to confirm the other speech recognition result.

19. The computer-readable memory device of claim 18, where when determining whether the second speech recognition result is incorrect, the instructions cause the processor to:
compare the calculated value to a portion of the second speech recognition result, and
determine that the second speech recognition result is incorrect when the calculated value does not match the portion of the second speech recognition result.

20. The computer-readable memory device of claim 18, further comprising:
one or more instructions to generate a plurality of speech recognition results, each of the plurality of speech recognition results potentially corresponding to the second voice input; and
one or more instructions to weigh the plurality of speech recognition results.

21. The computer-readable memory device of claim 18, where when accessing a first database, the instructions cause the processor to:
retrieve information based on at least one of the telephone number from which the telephone call was made or a name associated with the telephone number.

22. The computer-readable memory device of claim 18, where the plurality of characters comprises a plurality of letters and numbers and the subset of characters includes less than all of the letters in an alphabet.

23. A method, comprising:
receiving a telephone call from a user;
retrieving information based on a telephone number from which the telephone call was placed;
retrieving information associated with the telephone number;
prompting the user for information;
receiving a first voice input from the user based on the prompting
generating a first speech recognition result corresponding to the first voice input, the first speech recognition result identifying a year;

identifying grammars associated with the identified year;
receiving a second voice input from the user, the second voice input including a plurality of characters in a sequence, the plurality of characters corresponding to a first vehicle identification number;
generating a second speech recognition result based on the second voice input,
the generating a second speech recognition result including:
identifying at least a first one of the characters in the second voice input using at least a first one of the identified grammars, the first grammar being associated with identifying one or more characters in the sequence based on constraints associated with a position in the sequence, the constraints defining a subset of characters for which the second speech recognition result would be correct;
providing a first prompt to confirm a second vehicle identification number based on the second speech recognition; and
receiving information indicating that the second vehicle identification number corresponds to the first vehicle identification number or does not correspond to the first vehicle identification number.

24. The method of claim 23, further comprising:
comparing the retrieved information to the second speech recognition result; and
determining a likelihood that the second speech recognition result is correct based on the comparing.

25. The method of claim 23, further comprising:
performing a mathematical operation on the second speech recognition result; and
comparing a result of the mathematical operation to a portion of the second speech recognition result.

26. The method of claim 25, further comprising:
determining that the second speech recognition result is incorrect when the result of the mathematical operation does not match the portion of the second speech recognition result.

27. The method of claim 23, further comprising:
storing a plurality of grammars associated with performing speech recognition on the second voice input, at least some of the plurality of grammars being based on constraints associated with a subject matter for which the speech recognition is to be performed and the identified year.

28. The method of claim 23, further comprising:
generating a plurality of speech recognition results;
weighting each of the plurality of speech recognition results; and
selecting one of the plurality of speech recognition results as corresponding to the second voice input based on the weighting.

29. The method of claim 23, where the plurality of characters comprises a plurality of letters and numbers and the subset of characters includes less than all of the letters in an alphabet.

* * * * *